(12) United States Patent
Inukai (10) Patent No.: US 9,130,450 B2
(45) Date of Patent: Sep. 8, 2015

(54) POWER SUPPLY SYSTEM, IMAGE FORMING APPARATUS HAVING THE SAME, AND LOW-CAPACITY POWER SUPPLY CIRCUIT

(75) Inventor: Katsumi Inukai, Iwakura (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 468 days.

(21) Appl. No.: 13/558,099

(22) Filed: Jul. 25, 2012

(65) Prior Publication Data

US 2013/0031396 A1 Jan. 31, 2013

(30) Foreign Application Priority Data

Jul. 29, 2011 (JP) .................................. 2011-167385

(51) Int. Cl.
G06F 1/00 (2006.01)
H02M 7/06 (2006.01)
H02J 9/00 (2006.01)
H02M 3/335 (2006.01)
H02M 1/00 (2007.01)

(52) U.S. Cl.
CPC .............. H02M 7/066 (2013.01); H02J 9/005 (2013.01); H02M 3/33523 (2013.01); H02M 2001/0006 (2013.01); H02M 2001/0032 (2013.01); Y02B 70/16 (2013.01)

(58) Field of Classification Search
CPC ....... G06F 1/3202; G06F 1/3231; G06F 1/26; G06F 1/206; G06F 1/3228; G06F 1/08; G06F 1/3289; G06F 1/266; H04L 12/12; H04L 12/10
USPC .......................... 713/300, 310, 320, 322, 323
See application file for complete search history.

(56) References Cited

U.S. PATENT DOCUMENTS 4,910,654 A * 3/1990 Forge ............................... 363/49
5,659,371 A * 8/1997 Krause ........................... 348/730

(Continued)

FOREIGN PATENT DOCUMENTS

CN 201414082 Y 2/2010
CN 101753049 A 6/2010

(Continued)

OTHER PUBLICATIONS

Chinese Office Action issued in CN 201210268570, mailed May 6, 2014.

(Continued)

*Primary Examiner* — Zahid Choudhury
(74) *Attorney, Agent, or Firm* — Merchant & Gould PC (57) ABSTRACT

A power supply system includes: a switching power supply, which rectifies and smoothes an AC voltage of an AC power supply to generate a first DC voltage in a normal mode; a control unit, which controls the switching power supply to switch between the normal mode and a power saving mode; and a low-capacity power supply circuit, which supplies power to the control unit in the power saving mode, and which includes: a first capacitor, which includes a first electrode connected to one end of the AC power supply, and a second electrode; a second capacitor, which includes a first electrode connected to the other end of the AC power supply, and a second electrode; a rectifying circuit, which rectify an AC voltage applied to both capacitors; and a smoothing circuit, which smoothes the rectified AC voltage to generate a smooth voltage.

8 Claims, 4 Drawing Sheets

(56) References Cited

U.S. PATENT DOCUMENTS

| | | | |
|---|---|---|---|
| 5,914,538 A | 6/1999 | Kurosawa et al. | |
| 6,088,243 A | 7/2000 | Shin | |
| 6,476,589 B2 * | 11/2002 | Umminger et al. | 323/282 |
| 7,602,158 B1 | 10/2009 | Iacob | |
| 2004/0190923 A1 | 9/2004 | Inukai | |
| 2009/0168461 A1 * | 7/2009 | Nakahori | 363/17 |
| 2010/0149840 A1 | 6/2010 | Hayasaki et al. | |
| 2012/0113685 A1 | 5/2012 | Inukai | |

FOREIGN PATENT DOCUMENTS

| | | |
|---|---|---|
| DE | 100 31 196 A1 | 1/2002 |
| EP | 0 942 518 A2 | 9/1999 |
| JP | H07-087734 A | 3/1995 |
| JP | H07-308065 A | 11/1995 |
| JP | 2000-209862 A | 7/2000 |
| JP | 2001-251853 A | 9/2001 |
| JP | 2004-056946 A | 2/2004 |
| JP | 2004-151998 A | 5/2004 |
| JP | 2004-303469 A | 10/2004 |
| JP | 2008-096754 A | 4/2008 |
| JP | 2003-204676 A | 7/2009 |
| JP | 2010-239774 A | 10/2010 |
| JP | 2012-105378 A | 5/2012 |

OTHER PUBLICATIONS

Japanese Office Action issued in JP 2011-167385, dated Feb. 6, 2014.
European Search Report issued in EP 12177782.5 dated Mar. 19, 2014.
Japan Patent Office, Notification of Reasons for Refusal for Japanese Patent Application No. 2011-167385 (counterpart to above-captioned patent application), mailed Jun. 4, 2013.

* cited by examiner

POWER SUPPLY SYSTEM, IMAGE FORMING APPARATUS HAVING THE SAME, AND LOW-CAPACITY POWER SUPPLY CIRCUIT

CROSS-REFERENCE TO RELATED APPLICATION

This application claims priority from Japanese Patent Application No. 2011-167385 filed on Jul. 29, 2011, the entire subject matter of which is incorporated herein by reference.

TECHNICAL FIELD

This disclosure relates to a power supply system, an image forming apparatus having the power supply system, and a low-capacity power supply circuit, and more specifically, to a low-capacity power supply technology usable in a power saving mode and the like.

BACKGROUND

JP-A-H07-87734 discloses a main power control unit that, in a standby mode (power saving mode), stops oscillation of an output transformer of a switching power supply and then a secondary battery supplies power to the main power control unit such that power is saved.

Recently, it has been required to further save power for a switching power supply. In the technology disclosed in JP-A-H07-87734, even when the secondary battery is charged in the standby mode, the output transformer outputs 24V, and thus power is wastefully consumed. For this reason, a method using an electric double-layer capacitor or the like instead of the secondary battery can also be considered. However, in a case where a standby period is long, it is necessary to make the output transformer primarily oscillate to charge the electric double-layer capacitor, and thus it is desired to further save the power of the power supply system in the power saving mode.

SUMMARY

This disclosure was made on the basis of the above-mentioned circumferences, and this disclosure provides at least a technology capable of further saving power in a power saving mode.

With taking into consideration the above, a power supply system of this disclosure comprises: a switching power supply, a control unit, and a low-capacity power supply circuit. The switching power supply rectifies and smoothes an AC voltage of an AC power supply to generate a first DC voltage in a normal mode, in which oscillation is performed. The control unit controls the switching power supply to switch between the normal mode and a power saving mode, in which the oscillation of the switching power supply is stopped. The low-capacity power supply circuit, which supplies power to the control unit in the power saving mode. The low-capacity power supply circuit includes: a first capacitor, which includes a first electrode connected to one end of the AC power supply, and a second electrode; a second capacitor, which includes a first electrode connected to the other end of the AC power supply, and a second electrode; a rectifying circuit, which is connected between the second electrode of the first capacitor and the second electrode of the second capacitor to rectify an AC voltage applied to both capacitors; and a smoothing circuit, which is connected to the rectifying circuit, and which smoothes the rectified AC voltage to generate a smooth voltage.

According to this disclosure, since it is possible to rectify and smoothes an AC voltage applied to both of the first and second capacitors and then use the reflected and smoothed voltage as power in the power saving mode, it is unnecessary to perform control in the power saving mode so that oscillation of the switching power supply restarts. Accordingly, it is possible to further save power of the power supply system.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Embodiment

A first embodiment will be described with reference to FIGS. 1 to 3.

1. Description of Printer

Figure 1:
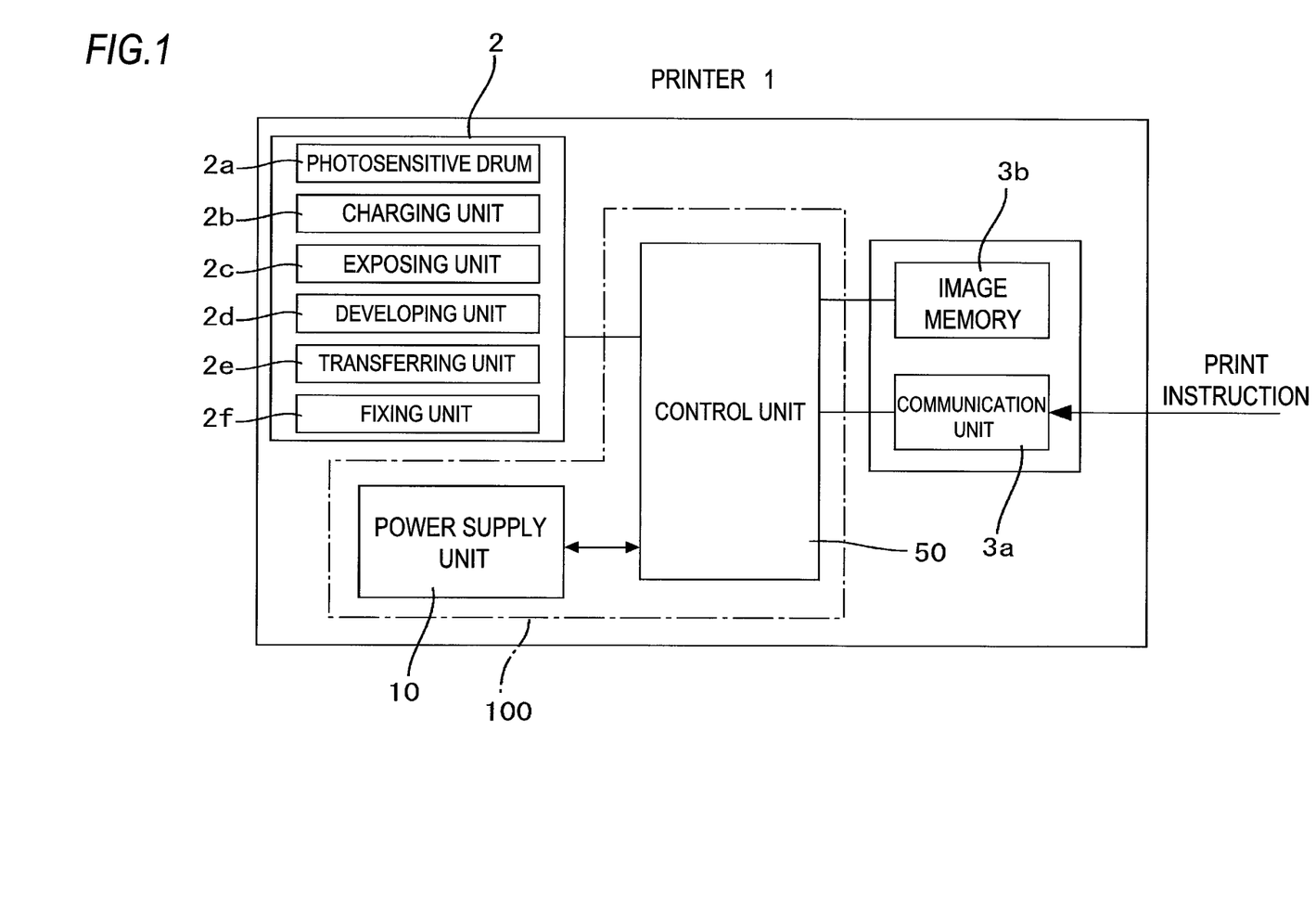
FIG. 1 is a block diagram illustrating a schematic configuration of an image forming apparatus according to a first embodiment.

FIG. 1 is a block diagram illustrating an electrical configuration of a printer 1 which is an example of an image forming apparatus. The printer 1 includes a printing unit 2, a communication unit 3a, an image memory 3b, and a power supply system 100. The power supply system 100 is configured by a power supply unit 10 and a control unit 50. The power supply unit 10 is a power supply of the printer 1, and supplies power to the printing unit 2, the communication unit 3a, the image memory 3b, and the control unit 50.

The printing unit 2 includes a photosensitive drum 2a, a charging unit 2b that performs a charging process of charging a surface of the photosensitive drum 2a, an exposing unit 2c that performs an exposing process of forming an electrostatic latent image on the surface of the photosensitive drum 2a, a developing unit 2d that performs a developing process of attaching a developer onto the electrostatic latent image formed on the surface of the photosensitive drum 2a so as to form a developer image, a transferring unit 2e that performs a transferring process of transferring the developer image onto a recording medium, a fixing unit 2f that performs a fixing process of fixing the developer image transferred on the recording medium, and the like.

The printing unit 2 performs the charging process, the exposing process, the developing process, the transferring process, and the fixing process, thereby performing a printing process of printing print data onto a recording medium. The communication unit 3a performs communication with an information terminal device such as a PC and has a function of receiving print instructions and print data from the information terminal device. The image memory 3b temporarily stores print data received from the information terminal device.

In the printer 1, if the communication unit 3a receives a print instruction and receives print data from the information terminal device, the control unit 50 makes the printing unit 2 perform the printing including the charging process, the exposing process, the developing process, the transferring process, and the fixing process in order to print the print data onto a recording medium. An operating voltage of the printing unit 2 is mainly 24V, and operating voltages of the communication unit 3a, the image memory 3b, and the control unit 50 are mainly 3.3V.

The printer 1 has a normal mode and a power saving mode as operation modes. The normal mode is a mode, in which the printer 1 can perform the printing process immediately in response to a print instruction. Therefore, in the normal mode, the power supply system 100 and the control unit 50 operate, and in this state, energization of the fixing unit 2f is controlled so that the fixing unit 2f is maintained at a temperature at which fixing is possible or a temperature slightly lower than the temperature at which fixing is possible. The power saving mode means a mode, in which the printer 1 does not receive any print instruction for a predetermined period and the printer 1 is in a standby state. In the power saving mode, only a portion of the power supply system 100 and the control unit 50 operates, and the fixing unit 2f is in non-energization.

2. Configuration of Power Supply System

The configuration of the power supply system 100 will be described with reference to FIG. 2. The power supply unit 10 of the power supply system 100 includes a switching power supply 20 and a low-capacity power supply circuit 30.

The switching power supply 20 includes a rectifying/smoothing circuit 21, a control IC 22, a voltage generating circuit 23, a transformer 24, a field effect transistor (FET) Q1, a rectifying/smoothing circuit 25, a voltage detecting circuit 26, and DC-DC converters 27 and 28.

In the normal mode, the switching power supply 20 rectifies and smoothes an AC voltage Vac of an AC power supply AC to generate DC voltages of +24 V, +5 V, and +3.3 V. Here, the DC voltage of +5 V corresponds to a first DC voltage. The DC voltage of +24 V (hereinafter, referred to as DC 24 V) is output from a first output terminal OUT1, the DC voltage of +5 V (hereinafter, referred to as DC 5 V) is output from a second output terminal OUT2, and the DC voltage of +3.3V (hereinafter, referred to as DC 3.3 V) is output from a third output terminal OUT3.

The rectifying/smoothing circuit 21 is a so-called capacitor input type, and includes a bridge diode for rectifying the AC voltage (240 V) of the AC power supply AC, and a capacitor for smoothing the rectified voltage. An output of the rectifying/smoothing circuit 21 is applied to a primary coil of the transformer 24.

The transistor Q1 is an N-channel MOSFET, and the transistor Q1 is turned on or off in response to an on/off signal (PWM signal) given to a gate of the transistor Q1 by the control IC 22. As a result, the primary side of the transformer 24 oscillates so that a voltage is induced at a secondary coil of the transformer 24.

Moreover, on the primary side of the transformer 24, the voltage generating circuit 23 is provided. The voltage generating circuit 23 rectifies and smoothes the voltage induced at an auxiliary coil provided on the primary side of the transformer 24, thereby generating a power supply voltage Vcc for the control IC 22.

The rectifying/smoothing circuit 25 rectifies and smoothes the voltage induced at the secondary coil of the transformer 24, thereby generating DC 24 V.

The voltage detecting circuit 26 includes a photocoupler PC1 and makes a light emitting diode LED1 of the photocoupler PC1 emit light in response to the detected level of the DC 24 V output by the switching power supply 20. The photocoupler PC1 includes a phototransistor PT1 connected to a feedback port FB of the control IC 22. Therefore, a light signal of the light emitting diode LED1 is converted into an electric signal by the phototransistor PT1, and the detected value of the output of DC 24 V is fed back to the feedback port FB of the control IC 22.

The DC-DC converter 27 converts DC 24 V into DC 5 V and outputs DC 5 V, and the DC-DC converter 28 converts DC 24 V into DC 3.3 V and outputs DC 3.3 V.

The control IC 22 controls the on/off signal for the transistor Q1 in response to a control pulse signal Scp input to a control input port EN, so that oscillation of the primary side of the transformer 24 is controlled. In the normal mode, the primary side of the transformer 24 oscillates to generate each DC voltage, and in the power saving mode, output of the on/off signal to the transistor Q1 stops so that oscillation of the primary side of the transformer 24 is stopped. In other words, in the power saving mode, any DC voltage is not output from the switching power supply 20. When the printer 1 returns from the power saving mode to the normal mode, the control pulse signal Scp is input from the control unit 50 to the control input port EN, and thus oscillation of the primary side of the transformer 24 starts in response to the control pulse signal Scp so that each DC voltage is output from the switching power supply 20. In other words, in the normal mode of the printer 1, the switching power supply 20 becomes an output mode, and in the power saving mode of the printer 1, the switching power supply 20 becomes an output stop mode.

The control unit 50 includes an application specific integrated circuit (ASIC) 51 and a switching power supply control unit 52. The ASIC 51 is configured by a main block B1 controlling the printing unit 2 of the printer 1, and a mode control block B2 mainly performing mode control on the printer 1. A portion of the mode control may be performed by the main block B1. The main block B1 and the mode control block B2 are not necessarily configured by the ASIC 51. For example, the main block B1 and the mode control block B2 may be configured by a main CPU and a sub CPU.

A power supply port P1 of the main block B1 receives DC 3.3V from the DC-DC converter 28 of the switching power supply 20. The main block B1 receives power and to be a operating state only in the normal mode, and if the switching power supply 20 shift into the output stop mode, that is, the power saving mode, the power supply is cut off so that the main block B1 stops.

On the other hand, a power supply port P2 of the mode control block B2 is connected to a DC-DC converter 33 of the low-capacity power supply circuit 30, and receives power from the low-capacity power supply circuit 30 in both the normal mode and the power saving mode. The mode control block B2 controls switching of the switching power supply 20 between the output mode and the output stop mode in which oscillation of the switching power supply 20 stops, in response to mode switching of the printer 1.

In other words, the mode control block B2 performs a function of switching the switching power supply 20 between the output mode and the output stop mode by outputting the control pulse signal Scp to the control IC 22. Here, the output mode is a mode, in which the primary side of the transformer 24 is oscillated so that the switching power supply 20 becomes the output mode, and is corresponding to the normal mode. Meanwhile, the output stop mode is a mode, in which the oscillation of the transformer 24 is stopped so that the output of the switching power supply 20 is stopped, and is corresponding to the power saving mode. As described above, in the power saving mode, since the output of the switching power supply 20 is stopped, the power is supplied to the control unit 50, in other words, the mode control block B2 of the AISC 51 and a switching power supply operation control unit 52, from the low-capacity power supply circuit 30.

The control pulse signal Scp is set to be output with a constant pulse width and the waveform to shift into the output mode is the same to the waveform to shift transfer into the output stop mode. The control pulse signal Scp corresponds to a restart signal.

The switching power supply operation control unit 52 includes a light emitting diode LED2 of a photocoupler PC2 and a transistor Q2. An anode of the light emitting diode LED2 is connected to a power supply line of 3.3 V from the DC-DC converter 33.

The light emitting diode LED2 configures the photocoupler PC2 with a phototransistor PT2 connected to the control input port EN of the control IC 22 of the switching power supply 20. Therefore, if the control pulse signal Scp is output from a control port P3 of the mode control block B2 to a base of the transistor Q2, the control pulse signal Scp is optically transmitted through the photocoupler PC2 and is input to the control input port EN of the control IC 22.

As described above, in a case of switching from the power saving mode to the normal mode, due to power supplied from the low-capacity power supply circuit 30, the control unit 50, specifically, the mode control block B2 of the ASIC 51 generates the control pulse signal Scp to restart oscillation of the switching power supply 20 and then transmits the control pulse signal Scp to the switching power supply 20. Therefore, it is possible to appropriately perform switching from the power saving mode to the normal mode using power accumulated during the power saving mode. Specifically, in the present embodiment, the control unit 50 can appropriately generate the control pulse signal Scp using energy of an storage capacitor C4 which is an example of a third capacitor, as will be described below. The user can use a switch 51 to instruct the mode control block B2 to perform mode switching A control signal Scon is output for turning on or off the DC-DC converter 28 of the switching power supply 20 from a port P4 of the mode control block B2. For example, in a case where power of DC 3.3 V supplied from the low-capacity power supply circuit 30 is sufficient even in the normal mode, the AISC 51 stops the operation of the DC-DC converter 28 of the switching power supply 20 by the control signal Scon.

3. Configuration of Low-Capacity Power Supply Circuit

Next, the low-capacity power supply circuit 30 will be described. The low-capacity power supply circuit 30 supplies power to the control unit 50 in the power saving mode and the normal mode. Specifically, in each mode, the low-capacity power supply circuit 30 supplies power to the mode control block B2 of the control unit 50 and the switching power supply operation control unit 52.

The low-capacity power supply circuit 30 includes a first capacitor C1, a second capacitor C2, a rectifying circuit 31, a smoothing circuit 32, the DC-DC converter 33, and the storage capacitor C4.

The first capacitor C1 includes a first electrode C1$p$1 and a second electrode C1$p$2, the first electrode C1$p$1 is connected to one end of the AC power supply AC, and the second electrode C1$p$2 is connected to the rectifying circuit 31. FIG. 2 shows an example in which the first electrode C1$p$1 of the first capacitor C1 is connected to a live-side power distribution line L of the AC power supply AC, which is one end of the AC power supply AC.

The second capacitor C2 includes a first electrode C2$p$1 and a second electrode C2$p$2, the first electrode C2$p$1 is connected to the other end of the AC power supply AC, and the second electrode C2$p$2 is connected to the rectifying circuit 31. Further, as shown as an example in FIG. 2, the first electrode C2$p$1 of the second capacitor C2 is connected to a neutral-side power distribution line N of the AC power supply AC, which is the other end of the AC power supply AC. The neutral-side power distribution line N is grounded.

The rectifying circuit 31 is electrically connected between the second electrode C1$p$2 of the first capacitor C1 and the second electrode C2$p$2 of the second capacitor C2, and the rectifying circuit 31 rectifies the AC voltage Vac applied to both capacitors C1 and C2. In the first embodiment, the rectifying circuit 31 is configured by a bridge circuit composed of four diodes D1, D2, D3, and D4. Cathodes of the diode D1 and the diode D2 are connected at a first contact node Nd1, an anode of the diode D1 is connected to the second electrode C1$p$2 of the first capacitor C1, and an anode of the diode D2 is connected to the second electrode C2$p$2 of the second capacitor C2.

Further, anodes of the diode D3 and the diode D4 are connected at a second contact node Nd2, a cathode of the diode D3 is connected to the second electrode C1$p$2 of the first capacitor C1, and a cathode of the diode D4 is connected to the second electrode C2$p$2 of the second capacitor C2. The second contact node Nd2 is set to a reference potential Vgd (0V). The reference potential Vgd may be set to a ground level. In other words, the second contact node Nd2 may be grounded.

The smoothing circuit 32 is connected to the rectifying circuit 31 and smoothes the rectified AC voltage to generate a smooth voltage Vsm. In the first embodiment, the smoothing circuit 32 includes a smoothing storage capacitor C3 which is an example of a smoothing capacitor, and a zener diode ZD1 which is an example of a constant voltage circuit.

The smoothing storage capacitor C3 is electrically connected to the terminal (second output terminal) OUT2 of the switching power supply 20 for outputting +5 V (first DC voltage), through a diode D5. For this reason, when power is supplied to the printer 1, the smoothing storage capacitor C3 and the storage capacitor C4 can be charged in a short time by the DC voltage of +5 V of the switching power supply 20. Therefore, even if the printer 1 enters the power saving mode in a short time after the power supply, since the smoothing storage capacitor C3 and the storage capacitor C4 are in a charged state, returning from the power saving mode to the normal mode can be performed immediately by the power of the smoothing storage capacitor C3 and the storage capacitor C4. The diode D5 prevents a backward flow from the smoothing storage capacitor C3 to the DC-DC converter 33.

Further, the zener diode ZD1 suppresses the smooth voltage Vsm from rising in a case where the AC voltage Vac of the AC power supply AC rises.

The DC-DC converter 33 converts the smooth voltage Vsm into the DC voltage of +3.3 V (corresponding to a second DC voltage). The DC voltage of +3.3 V is supplied to the switching power supply operation control unit 52 and the power supply port P2 of the mode control block B2. In other words, the power of the mode control block B2 is supplied from the low-capacity power supply circuit 30.

The storage capacitor C4 is charged by DC 3.3 V from the DC-DC converter 33. The charged power is used for a drive current of the light emitting diode LED2 of the photocoupler PC2 when switching from the power saving mode to the normal mode. The storage capacitor C4 corresponds to the third capacitor. The capacitances of the smoothing storage capacitor C3 and the storage capacitor C4 are appropriately selected, so that it is possible to accumulate an amount of power according to the needs for a predetermined voltage in the power saving mode. In the first embodiment, it is possible to accumulate an amount of power to surely drive the light emitting diode LED2 of the photocoupler PC2. Therefore, it is possible to reliably restart the switching power supply 20.

For example, in a case where the AC input voltage Vac is set to 240 V (effective value), the capacitances of the capacitors C1 and C2 are set to 3300 pF (pico-farads), each of the forward voltage drops of the diodes D1 to D4 are set to 0.6 V, a load current is set to 50 µA, and the zener voltage of the zener diode ZD1 is set to 6.2 V, the power consumption of the low-capacity power supply circuit 30 is about 800 µW (microwatts), regardless of whether the printer 1 is connected to a frame ground. This has been confirmed by experiments. In a case where the zener diode ZD1 does not exist, under the same condition, if the printer 1 is connected to a frame ground, the power consumption is about 6 mW (milliwatts), and if the printer 1 is not connected to a frame ground, the power consumption is about 5 mW. This has been confirmed by experiments.

In the case where the printer 1 is connected to a frame ground, a rectified current becomes a half-wave rectified wave, and in the case where the printer 1 is not connected to a frame ground, the rectified current becomes a full-wave rectified wave. Further, in the case where the printer 1 is connected to a frame ground, either the first capacitor C1 or the second capacitor C2 contributes to circuit impedance, and in the case where the printer 1 is not connected to a frame ground, both the first capacitor C1 and the second capacitor C2 contributes to circuit impedance. Therefore, the maximum value of the full-wave rectified wave becomes almost a half of the maximum value of the half-wave rectified wave, and thus the power consumption becomes almost constant regardless of whether the printer 1 is connected to a frame ground.

Meanwhile, in the power saving mode, in a case where oscillation of the switching power supply 20 restarts so that the electric double-layer capacitor is charged, for example, if the electric double-layer capacitor is charged for two minutes every three hours and the power consumption of the primary side of the transformer 24 during the charging is set to 2 W (watts), average power increases by about 22 mW. Therefore, due to the low-capacity power supply circuit 30 of the present embodiment in which it is unnecessary to perform oscillation of the switching power supply 20 as described above, in the power saving mode, the power consumption in the power saving mode is significantly reduced.

3. Effects of First Embodiment

Since the AC voltage Vac to applied to both capacitors C1 and C2 can be rectified and smoothed and also the low-capacity power supply circuit 30 can be used as a power supply in the power saving mode, it is unnecessary to restart oscillation of the switching power supply 20 in the power saving mode to perform charge, and thus it is possible to further save power for the power supply system 100.

Figure 2:
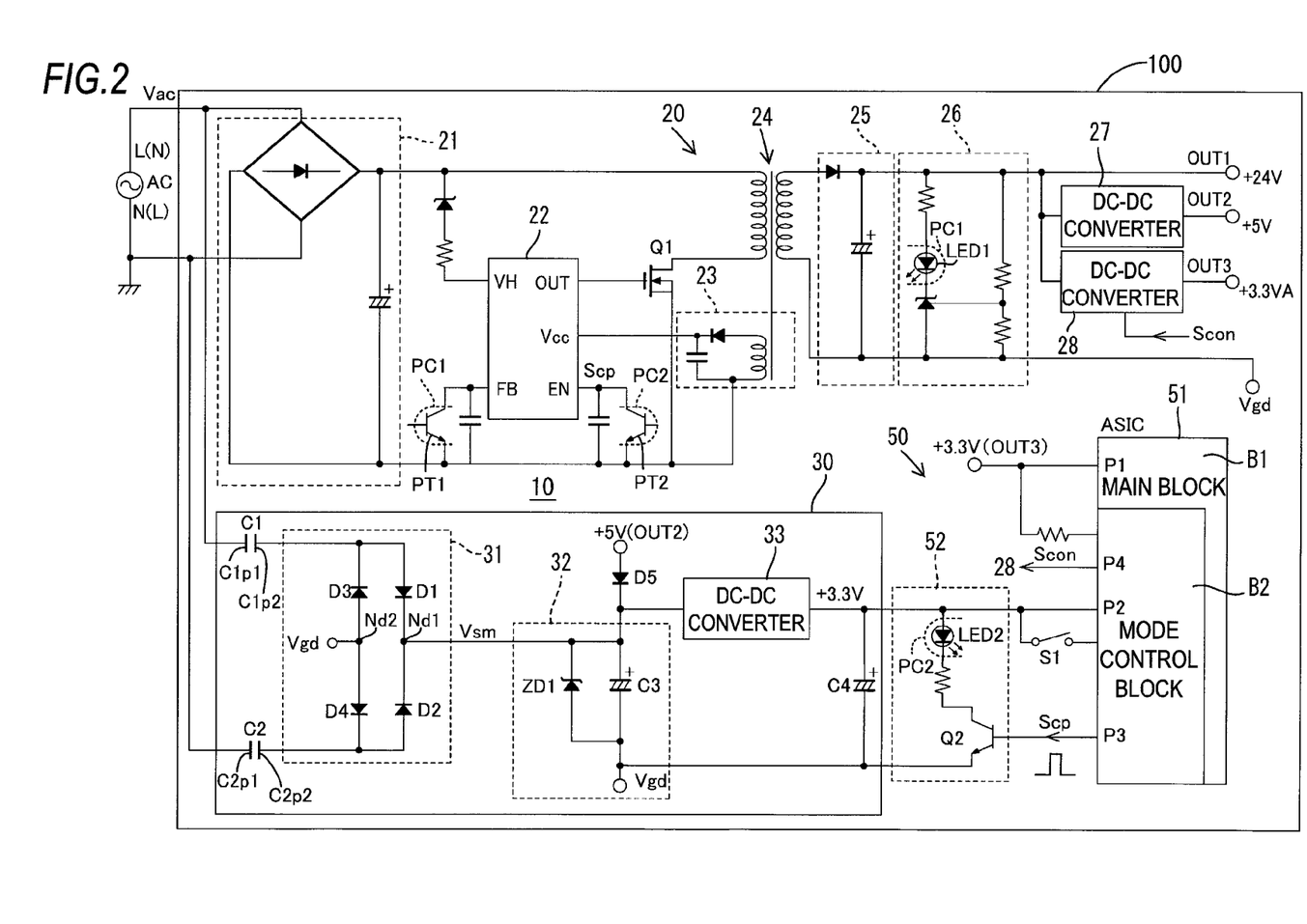
FIG. 2 is a block diagram illustrating a schematic configuration of a power supply system according to the first embodiment.
Figure 3:
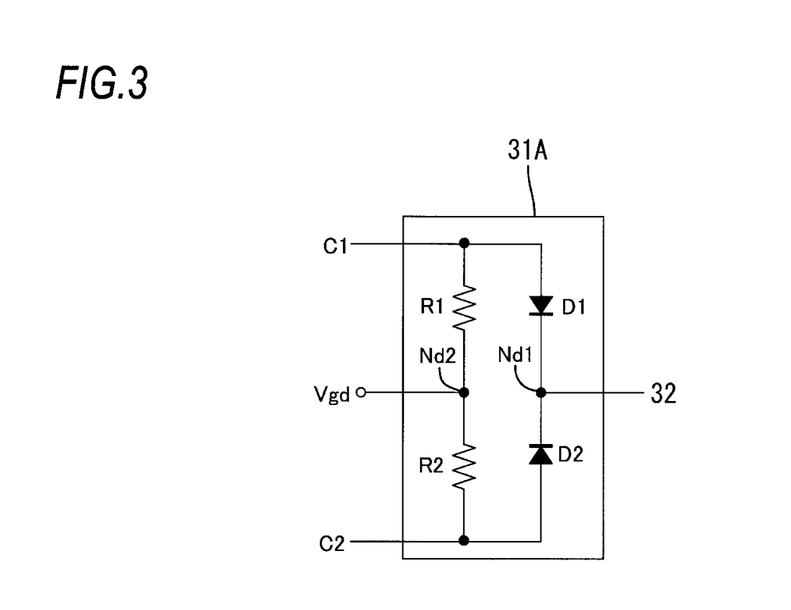
FIG. 3 is a circuit diagram illustrating another bridge circuit according to the first embodiment.

In the first embodiment, the bridge circuit of the rectifying circuit 31 is not limited to the configuration shown in FIG. 2 and but may be a bridge circuit shown in FIG. 3, for instance. The bridge circuit of a rectifying circuit 31A is configured by replacing the diodes D3 and D4 of the bridge circuit shown in FIG. 2, with resistors R1 and R2.

Second Embodiment

Figure 4:
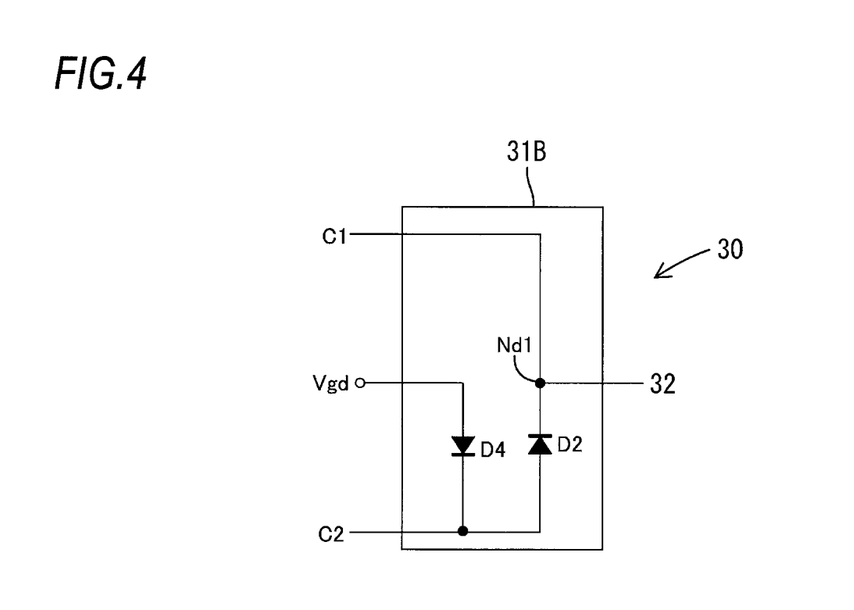
FIG. 4 is a circuit diagram illustrating a configuration of a rectifier circuit according to a second embodiment.

Next, a second embodiment of the power supply system 100 will be described with reference to FIG. 4. FIG. 4 illustrates a rectifying circuit 31B of the low-capacity power supply circuit 30 according to the second embodiment. The second embodiment is different from the power supply system 100 of the first embodiment only in the configuration of the rectifying circuit 31B. Therefore, this difference will be described and identical components will not be described.

In the second embodiment, the rectifying circuit 31B does not have a bridge circuit. As shown in FIG. 4, the rectifying circuit 31B is obtained by removing the diodes D1 and D3 from the rectifying circuit 31 according to the first embodiment.

In other words, the cathode of the diode D2 is connected to the second electrode $C1p2$ of the first capacitor and the smoothing circuit 32, and the anode of the diode D2 is connected to the second electrode $C2p2$ of the second capacitor. Further, the anode of the diode D4 is set to the reference potential Vgd (0 V). The cathode of the diode D4 is connected to the second electrode $C2p2$ of the second capacitor.

Even in the second embodiment, in the case where the zener diode ZD1 exists and the printer 1 is not connected to a frame ground, the power consumption of the low-capacity power supply circuit 30 is about 800 µW (microwatts). This has been confirmed under the same experiment condition as that in the first embodiment.

Figure 5:
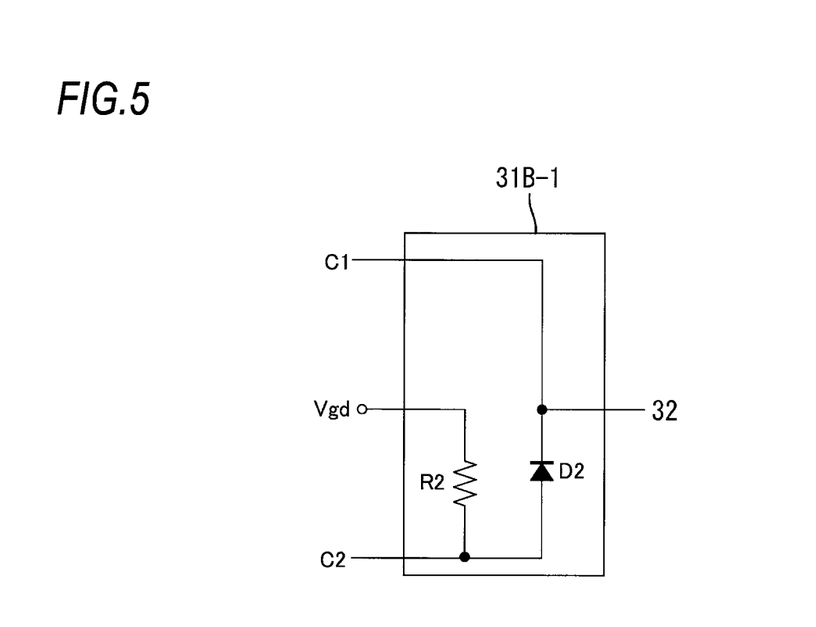
FIG. 5 is a circuit diagram illustrating a configuration of another rectifier circuit according to the second embodiment.

In the second embodiment, the rectifying circuit 31B is not limited to the configuration shown in FIG. 4, and but may be a rectifying circuit 31B-1 shown in FIG. 5, for example. The rectifying circuit 31B-1 is obtained by replacing the diode D4 of the rectifying circuit 31B shown in FIG. 4 with a resistor R2.

Other Embodiments

This disclosure is not limited to the embodiments described with reference to the drawings, but, for example, the following embodiments are included in the technical scope of this disclosure.

(1) In each of the above-mentioned embodiments, the smoothing storage capacitor C3 is connected to the terminal (OUT2) of the switching power supply 20 for outputting the DC voltage of +5 V, through the diode D5. However, this configuration is not needed and may be omitted. In other words, the smoothing storage capacitor C3 may not be connected to the second output terminal OUT2 of the switching power supply 20.

(2) In each of the above-mentioned embodiments, the zener diode ZD1, which is a constant voltage circuit, is not needed and may be omitted. In other words, the constant voltage circuit may be omitted.

(3) In each of the above-mentioned embodiments, the DC-DC converter 33 and the storage capacitor C4 are not needed and may be omitted. In this case, the drive current of the light emitting diode LED2 of the photocoupler PC2 is supplied from the smoothing storage capacitor C3. Further, it is required to select the zener diode ZD1 so that the smooth voltage Vsm becomes almost +3.3 V.

(4) In each of the above-mentioned embodiments, the power supply system 100 disclosed in the present specification is applied to the image forming apparatus. However, this disclosure is not limited thereto. The power supply system 100 can be applied to various apparatuses having a normal mode and a power saving mode.

What is claimed is:

1. A power supply system comprising:
   a switching power supply, which rectifies and smoothes an AC voltage of an AC power supply to generate a first DC voltage in a normal mode, in which oscillation is performed;
   a control unit, which controls the switching power supply to switch between the normal mode and a power saving mode, in which the oscillation of the switching power supply is stopped; and
   a low-capacity power supply circuit, which supplies power to the control unit in the power saving mode, and which includes:
      a first capacitor, which includes a first electrode connected to one end of the AC power supply, and a second electrode;
      a second capacitor, which includes a first electrode connected to the other end of the AC power supply, and a second electrode;
      a rectifying circuit, which is connected between the second electrode of the first capacitor and the second electrode of the second capacitor to rectify an AC voltage applied to both capacitors;
      a smoothing circuit, which is connected to the rectifying circuit, and which smoothes the rectified AC voltage to generate a smooth voltage;
      a DC-DC converter, which converts the smooth voltage into a second DC voltage; and
      a third capacitor, which is charged by the second DC voltage;
   wherein, when switching from the power saving mode to the normal mode, the control unit generates a restart signal to restart the oscillation of the switching power supply by power supplied from the low-capacity power supply circuit, and the control unit transmits the restart signal to the switching power supply by power accumulated in the third capacitor.

2. The power supply system according to claim 1, wherein, when switching from the power saving mode to the normal mode, the control unit generates a restart signal to restart the oscillation of the switching power supply by power supplied from the low-capacity power supply circuit, and the control unit transmits the restart signal to the switching power supply.

3. The power supply system according to claim 1, wherein the smoothing circuit includes a smoothing capacitor, and
   wherein the smoothing capacitor is electrically connected to an output terminal of the switching power supply outputting the first DC voltage.

4. The power supply system according to claim 3, wherein the low-capacity power supply circuit further includes a constant voltage circuit that is connected in parallel with the smoothing capacitor.

5. An image forming apparatus having a normal mode and a power saving mode, comprising the power supply system according to claim 1.

6. A low-capacity power supply circuit comprising:
   a first capacitor, which includes a first electrode connected to one end of an AC power supply, and a second electrode; a second capacitor, which includes a first electrode connected to the other end of the AC power supply, and a second electrode;
   a rectifying circuit, which is connected between the second electrode of the first capacitor and the second electrode of the second capacitor to rectify an AC voltage applied to both capacitors,
   a smoothing circuit, which is connected to the rectifying circuit, and which smoothes the rectified AC voltage;
   a DC-DC converter, which converts the smooth voltage into a second DC voltage; and
   a third capacitor, which is charged by the second DC voltage;
   wherein, when switching from a power saving mode to a normal mode, a control unit generates a restart signal to restart oscillation of a switching power supply by power supplied from the low-capacity power supply circuit, and the control unit transmits the restart signal to the switching power supply by power accumulated in the third capacitor.

7. A power supply system comprising:
   a switching power supply, which rectifies and smoothes an AC voltage of an AC power supply to generate a first DC voltage in a normal mode, in which oscillation is performed;
   a control unit, which controls the switching power supply to switch between the normal mode and a power saving mode, in which the oscillation of the switching power supply is stopped; and
   a low-capacity power supply circuit, which supplies power to the control unit in the power saving mode, and which includes:
      a first capacitor, which includes a first electrode connected to one end of the AC power supply, and a second electrode;
      a second capacitor, which includes a first electrode connected to the other end of the AC power supply, and a second electrode;
      a rectifying circuit, which is connected between the second electrode of the first capacitor and the second electrode of the second capacitor to rectify an AC voltage applied to both capacitors; and
      a smoothing circuit, which is connected to the rectifying circuit, and which smoothes the rectified AC voltage to generate a smooth voltage;
   wherein, when switching from the power saving mode to the normal mode, the control unit generates a restart signal to restart the oscillation of the switching power supply by power supplied from the low-capacity power supply circuit, and the control unit transmits the restart signal to the switching power supply, and
   wherein the restart signal is a pulse signal.

8. A power supply system comprising:
   a switching power supply, which rectifies and smoothes an AC voltage of an AC power supply to generate a first DC voltage in a normal mode, in which oscillation is performed;
   a control unit, which controls the switching power supply to switch between the normal mode and a power saving mode, in which the oscillation of the switching power supply is stopped; and a low-capacity power supply circuit, which supplies power to the control unit in the power saving mode, and which includes:
  a first capacitor, which includes a first electrode connected to one end of the AC power supply, and a second electrode;
  a second capacitor, which includes a first electrode connected to the other end of the AC power supply, and a second electrode;
  a rectifying circuit, which is connected between the second electrode of the first capacitor and the second electrode of the second capacitor to rectify an AC voltage applied to both capacitors; and
  a smoothing circuit, which is connected to the rectifying circuit, and which smoothes the rectified AC voltage to generate a smooth voltage;
  wherein the smoothing circuit includes a smoothing capacitor,
  wherein the smoothing capacitor is electrically connected to an output terminal of the switching power supply outputting the first DC voltage, and
  wherein the smoothing capacitor is charged by power from the switching power supply.

* * * * *